(12) United States Patent
Takahashi

(10) Patent No.: US 6,542,115 B2
(45) Date of Patent: Apr. 1, 2003

(54) GPS RECEIVER SYSTEM FOR ACQUIRING AZIMUTH INFORMATION USING A PAIR OF GPS RECEIVERS

(75) Inventor: Masato Takahashi, c/o Communications Research Laboratory, Independent Administrative Institution, 4-2-1 Nukei-kitamachi, Koganei-shi, Tokyo (JP)

(73) Assignees: Communications Research Laboratory, Independent Administrative Institution, Koganei (JP); Masato Takahashi, Koganei (JP)

( * ) Notice: Subject to any disclaimer, the term of this patent is extended or adjusted under 35 U.S.C. 154(b) by 0 days.

(21) Appl. No.: 09/995,597

(22) Filed: Nov. 29, 2001

(65) Prior Publication Data

US 2002/0171582 A1 Nov. 21, 2002

(51) Int. Cl.[7] ............................. H04D 7/185; G01S 5/02
(52) U.S. Cl. .................. 342/357.09; 701/215; 701/213; 342/357.06
(58) Field of Search ....................... 342/357.09, 357.06; 701/215, 213

(56) References Cited

U.S. PATENT DOCUMENTS

| 5,767,804 | A | * | 6/1998 | Murphy | 342/357.09 |
| 5,781,150 | A | * | 7/1998 | Norris | 342/357.08 |
| 6,246,376 | B1 | * | 6/2001 | Bork et al. | 342/357.13 |
| 6,281,841 | B1 | * | 8/2001 | Nevill | 342/357.06 |
| 6,363,324 | B1 | * | 3/2002 | Hildebrant | 342/357.08 |
| 6,430,498 | B1 | * | 8/2002 | Maruyama et al. | 342/357.08 |
| 6,442,480 | B1 | * | 8/2002 | Takahashi | 701/215 |

* cited by examiner

*Primary Examiner*—Thomas H. Tarcza
*Assistant Examiner*—Fred H Mull
(74) *Attorney, Agent, or Firm*—Oblon, Spivak, McClelland, Maier & Neustadt, P.C.

(57) ABSTRACT

A GPS receiver includes an antenna unit, a GPS receiver unit, a result output unit, a data transmitting unit, a data receiving unit, a data processing unit for carrying out calculation on data containing a strength value of each received GPS satellite signal to limit or determine an azimuth of a measurement direction, and a use mode control switch.

6 Claims, 6 Drawing Sheets

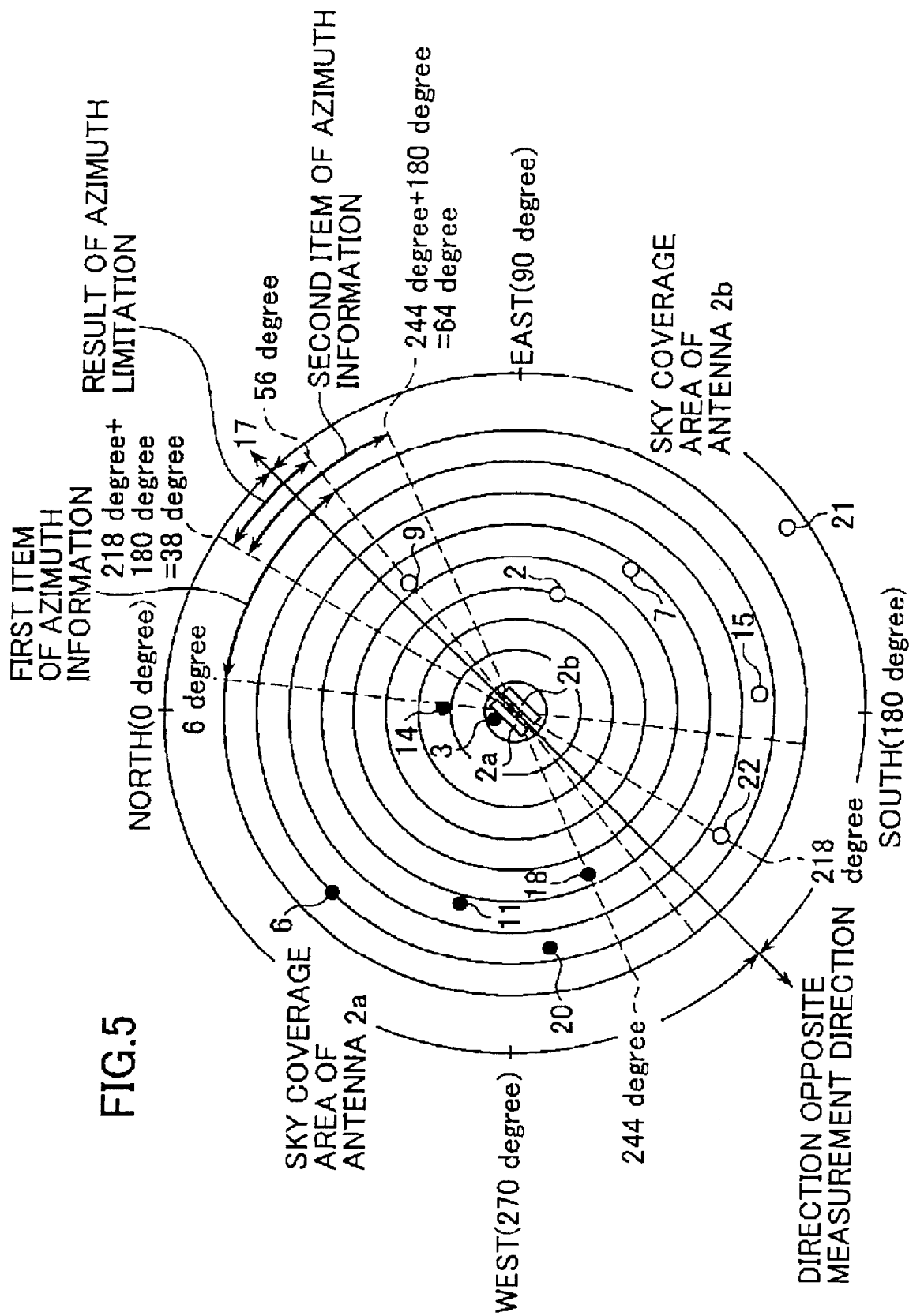

GPS RECEIVER SYSTEM FOR ACQUIRING AZIMUTH INFORMATION USING A PAIR OF GPS RECEIVERS

BACKGROUND OF THE INVENTION

1. Field of the Invention

This invention relates to a GPS (Global Positioning System) receiver and a GPS receiver system including a pair of GPS receivers that enables acquisition of not only positioning information but also azimuth information.

2. Description of the Prior Art

Previously, the conventional GPS receiver, which was equipped with an antenna unit having a substantially hemispherical antenna pattern, a receiver unit and a result output unit, was able to utilize signals transmitted by multiple GPS satellites to acquire such positioning information as latitude, longitude, altitude and GPS time but was incapable of acquiring azimuth information.

The inventor therefore developed a method for acquiring azimuth information by use of a pair of planar patch antennas (U.S. Ser. No. 09/818,844 and Japanese Patent Application Nos. 2000-91362 and 2001-93964).

This method for acquiring azimuth information includes a step of disposing a pair of planar patch antennas back-to-back, parallel to each other and vertical, whereby each planar patch antenna forms a sky coverage area of antenna sensitivity that is a sky quarter-sphere in the direction the antenna faces; a step of causing receiver units connected to the respective antennas to extract strength values of all received GPS satellite signals; a step of discriminating based on a comparison of the extracted signal strength values the antenna in whose sky coverage area the GPS satellite that transmitted each signal is present; a stop of arranging the results of the step of discriminating areas of satellite presence in a ring-like sequence; and a step of determining or limiting an azimuth of a measurement direction based on information contained in a ring-like discrimination results sequence.

Thus, in order to acquire azimuth information, it is necessary to compare the strength values of multiple satellite signals received by two GPS receivers and to discriminate the antenna in whose sky coverage area each GPS satellite is present. Since conventional GPS receivers are not capable of exchanging information with each other or of calculating azimuth information based on exchanged information, however, it has not been possible to acquire azimuth information even by disposing a pair of GPS receivers with their patch antennas disposed back-to-back, parallel to each other and vertical.

The present invention was accomplished in light of the foregoing circumstances and has as an object to provide a GPS receiver and a GPS receiver system including a pair of GPS receivers that enables acquisition of not only positioning information as heretofore but also azimuth information.

SUMMARY OF THE INVENTION

The invention achieves this object by providing a GPS receiver including an antenna unit, a GPS receiver unit and a result output unit, the GPS receiver comprising; a data transmitting unit, a data receiving unit, a data processing unit for carrying out calculation on data containing a strength value of each received GPS satellite signal to limit or determine an azimuth of a measurement direction, and a use mode control switch.

The data transmitting unit incorporates an infrared transmit facility, the data receiving unit incorporates an infrared receive facility, and the data transmitting unit and the data receiving unit are installed symmetrically with respect to a center point of their installation surface. Thus when two GPS receivers are placed in opposite vertical orientation (one right side up and the other upside down) with the sides on which the data transmitting units and data receiving units are installed facing each other, the data transmitting unit and data receiving unit of each GPS receiver faces the data receiving unit and data transmitting unit of the other. The GPS receivers paired in this manner, which constitute a GPS receiver system according to the present invention, can therefore easily exchange (send/receive) data by means of infrared beams without being electrically connected.

As each GPS receiver is provided with a data transmitting unit, a data receiving unit and a data processing unit in the foregoing manner, the GPS satellite data received by one GPS receiver can be transmitted to the other GPS receiver, and each data processing unit can process the satellite data acquired by both GPS receivers to acquire not only positioning information but also azimuth information.

Owing to the use of the infrared communications system, moreover, the two GPS receivers are easier to handle because they do not need to be interconnected by a cable.

The above and other objects and features of the invention will become apparent from the following description made with reference to the drawings.

BRIEF EXPLANATION OF THE DRAWINGS

FIG. 5 is diagram for explaining a positional relationship between satellites in the sky and a pair of antennas when GPS receivers according to the present invention are used as a GPS receiver system to acquire azimuth information.

FIG. 6(*b*) is a perspective view for explaining how azimuth information is acquired using a mercury switch as an operation switch

DESCRIPTION OF THE PREFERRED EMBODIMENT

Figure 1:
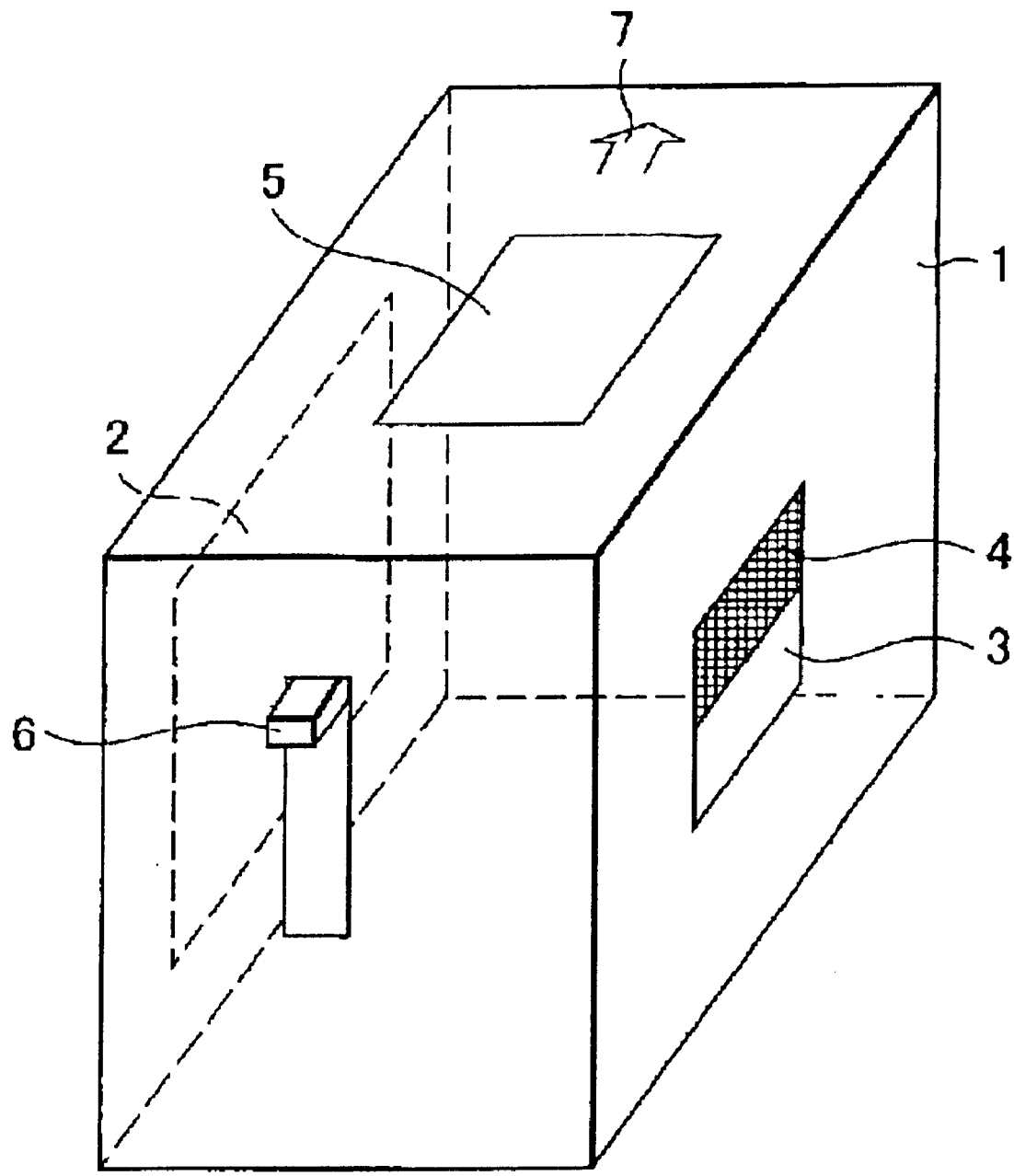
FIG. 1 is a perspective view showing a GPS receiver that is an embodiment of the present invention.

FIG. 1 shows a GPS receiver 1 that is an embodiment of the present invention. The GPS receiver 1 is box-like in shape and has embedded in one of its side surfaces a planar patch antenna 2 whose sensitivity extends over a sky hemisphere in the direction it faces. The opposite surface of the GPS receiver 1 is provided with a data receiving unit 3 and a data transmitting unit 4 which are installed to be symmetrically located with respect to the center point of the installation surface.

Figure 3:
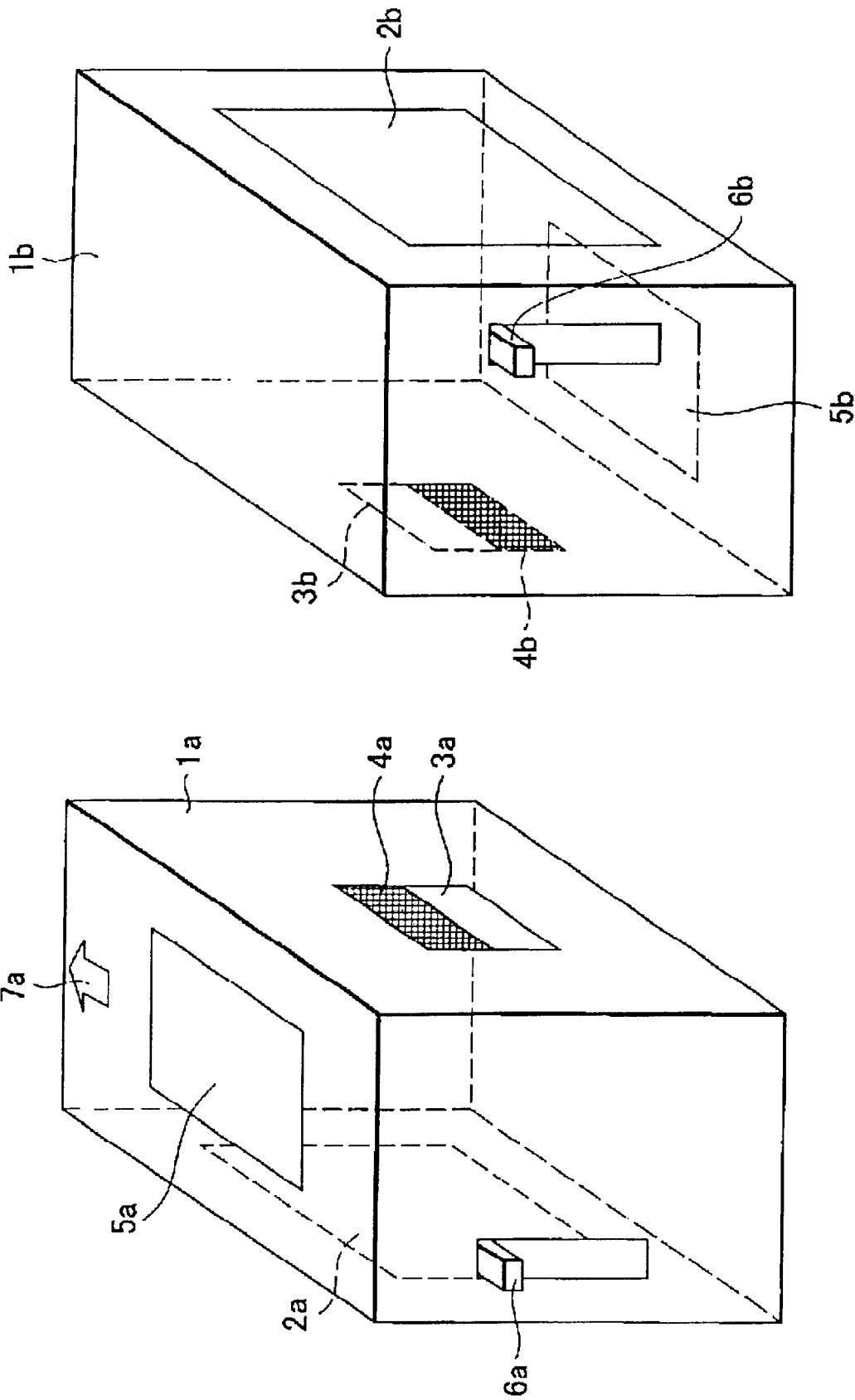
FIG. 3 is a perspective view showing how a pair of GPS receivers constituting a GPS receiver system are used to acquire azimuth information.

As shown in FIG. 3, therefore, when two GPS receivers 1*a*, 1*b* are placed in opposite vertical orientation (i.e., so that the top side of one corresponds to the bottom side of the other) with the sides on which the data transmitting units 4 and data receiving units 3 are installed facing each other, the data transmitting unit 4a and data receiving unit 3a of one GPS receiver 1a faces the data receiving unit 3b and data transmitting unit 4b of the other GPS receiver 1b. The two GPS receivers 1a, 1b set up in this manner constitute a GPS receiver system according to the present invention. An infrared communications system can be effectively utilized for data transmission and reception.

Figure 2:
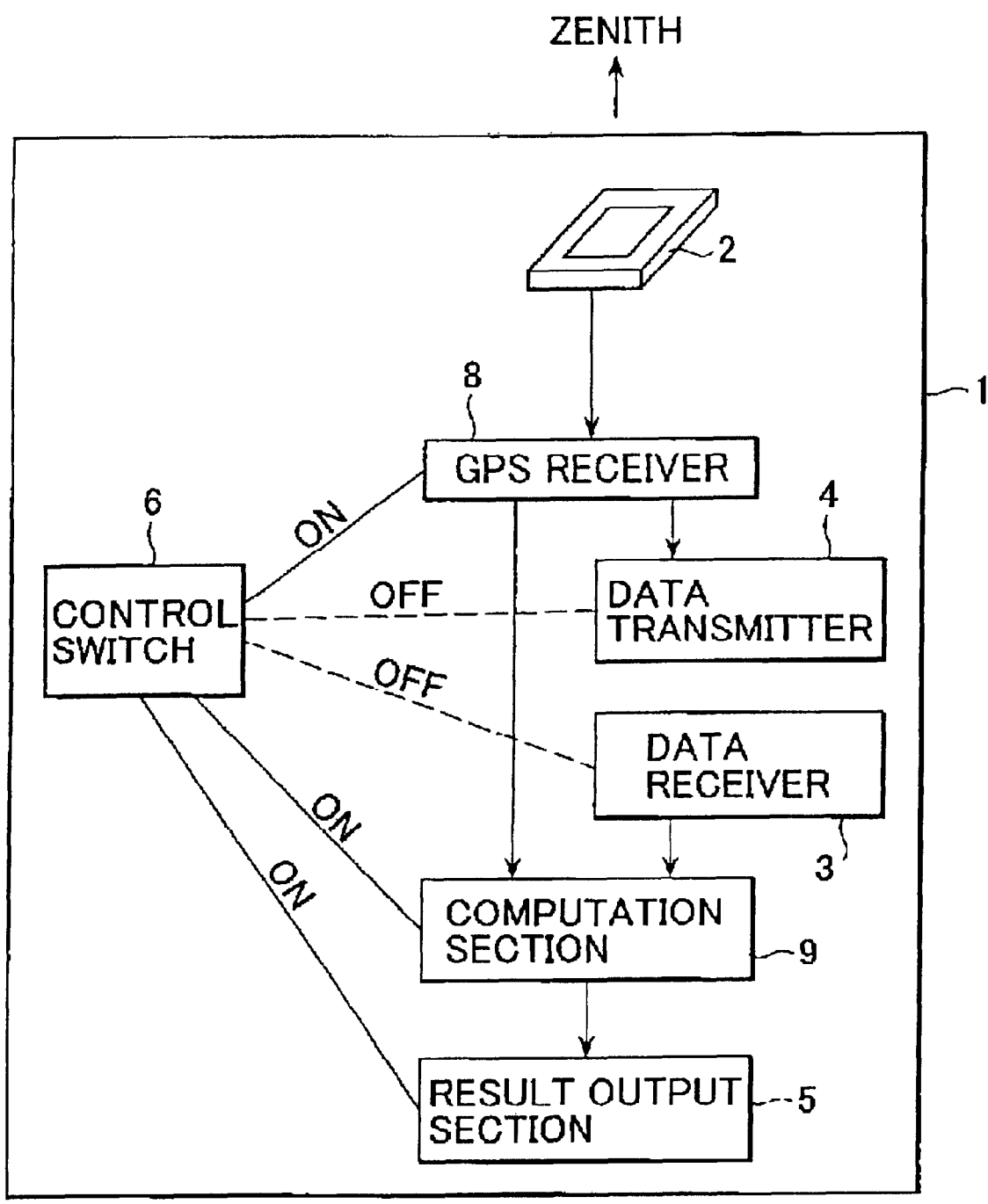
FIG. 2 is a diagram for explaining how the GPS receiver according to the present invention is used to acquire positioning information.

As shown in FIG. 2, the GPS receiver 1 is internally equipped with a GPS receiver unit 8 and a data processing unit 9 whose outputs are sent to a liquid display, speaker or other result output unit 5 provided on the top surface of the GPS receiver 1 for output.

A control switch 6 is provided on one side surface of the GPS receiver 1 for turning the GPS receiver unit 8, data transmitting unit 4, data receiving unit 3, data processing unit 9 and result output unit 5 ON or OFF according to the use mode. An arrow (mark) 7 is printed on the top surface of the GPS receiver 1 to indicate the measurement direction.

The case where the GPS receiver 1 of the foregoing configuration is used to acquire positioning information is shown in FIG. 2. Specifically, the control switch 6 is operated to send ON signals to the GPS receiver unit 8, data processing unit 9 and result output unit 5 and send OFF signals to the data receiving unit 3 and data transmitting unit 4, and the GPS receiver 1 is placed so that the planar patch antenna 2 is directed toward the zenith.

As a result, the GPS receiver unit 8 receives signals transmitted by the GPS satellites present in the sky hemisphere via the planar patch antenna 2, and the calculated latitude, longitude, altitude and other positioning information are passed through the data processing unit 9 to be output by the result output unit 5 in same way as in a conventional GPS receiver.

The case where a pair of GPS receivers 1a, 1b of the foregoing configuration are used to acquire azimuth information is shown in FIG. 3. Specifically, one GPS receiver 1a is placed with its planar patch antenna 2a perpendicular to the ground and the mark 7a indicating measurement direction pointing in the direction desired to be ascertained.

The other GPS receiver 1b is placed so that the data transmitting unit 4b and data receiving unit 3b lie parallel to and face the data receiving unit 3a and data transmitting unit 4a of the GPS receiver 1a across a prescribed distance As a result, the planar patch antennas 2a, 2b are disposed back-to-back, parallel to each other and perpendicular to the ground, whereby each planar patch antenna forms a sky coverage area of antenna sensitivity that is a sky quartersphere in the direction the antenna faces.

Figure 4:
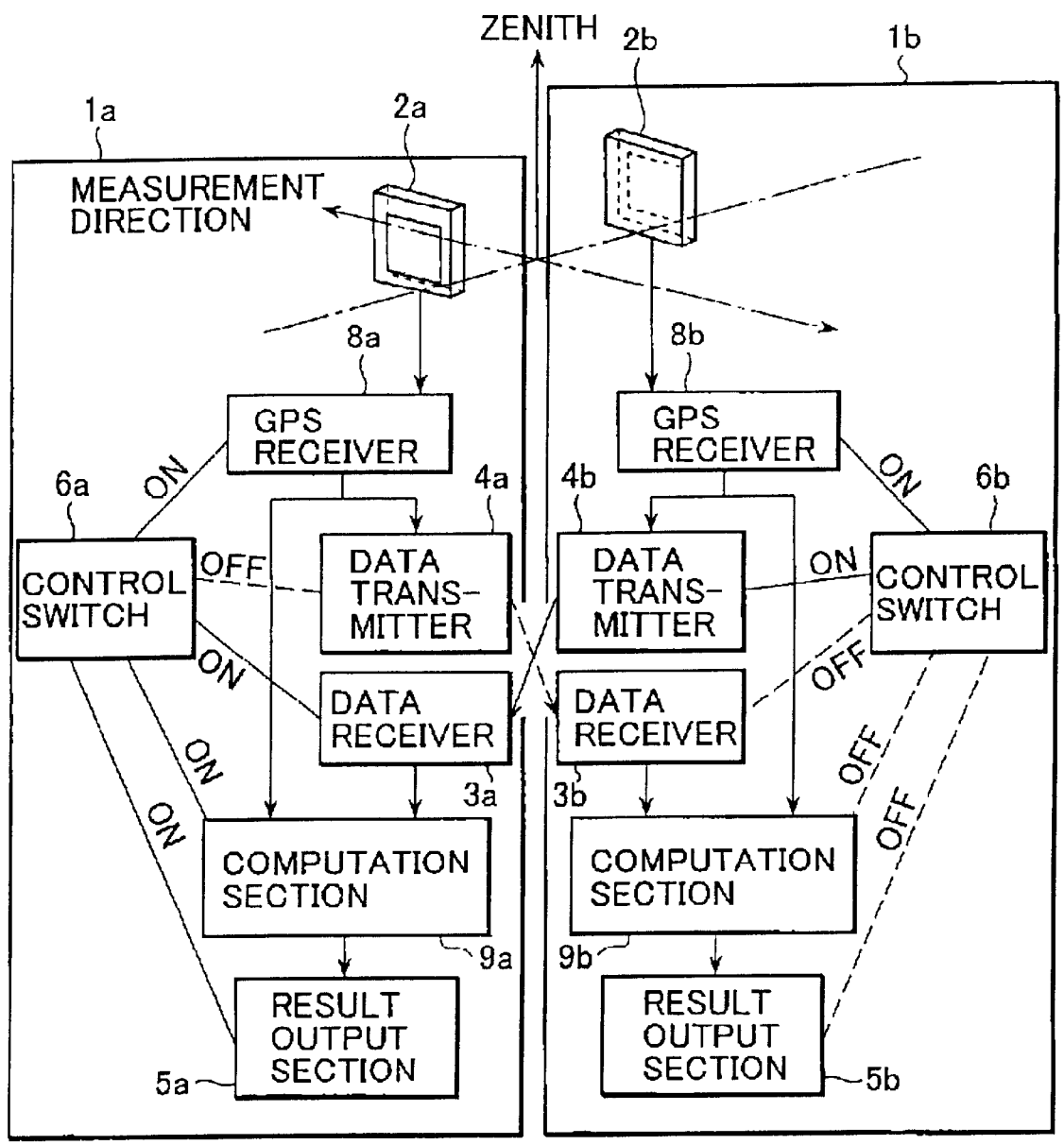
FIG. 4 is a diagram for explaining how a pair of GPS receivers according to the present invention are used as a GPS receiver system to acquire azimuth information.

As shown in FIG. 4, the control switch 6a of the GPS receiver 1a is operated to send ON signals to the GPS receiver unit 8a, the data receiving unit 3a, the data processing unit 9a and the result output unit 5a. The control switch 6a of the GPS receiver 1b is operated to send ON signals only to the GPS receiver unit 8b and the data transmitting unit 4b.

As a result, the GPS receiver unit 8a connected to the planar patch antenna 2a receives signals transmitted by GPS satellites present in the antenna's sky coverage area and forwards the received signals to the data processing unit 9a.

Similarly, the GPS receiver unit 8b connected to the planar patch antenna 2b receives signals transmitted by GPS satellites present in the antenna's sky coverage area and the data transmitting unit 4b transmits the received signals by means of, for example, an infrared beam to the data receiving unit 3a of the GPS receiver 1a to be stored in the data processing unit 9a.

The signal transmitted by each GPS satellite includes the satellite number and the satellite signal transmit time of the GPS satellite concerned, and also the orbital elements of all GPS satellites. The satellite number can therefore be detected at the decode stage. In the GPS receiver units 8a, 8b, moreover, the strength of a signal sync circuit output signal can be detected. In addition, since the GPS receiver units 8a, 8b calculate the location of the measurer and the time from the signals received from three or more satellites, the azimuth and angle of elevation of each satellite can be calculated at the same time.

In order to ascertain azimuth information from the satellite numbers, satellite angles of elevation, satellite azimuths and satellite signal strengths included in the information output by the GPS receiver units 8a, 8b, the data processing unit 9a conducts the following processing.

First, it conducts "satellite exclusion discrimination" processing with regard to causes for exclusion. The first cause for exclusion is "high angle of elevation." Satellites near the zenith, even if observed to have azimuths that differ numerically, actually have small azimuths in terms of elongation. If information from these satellites should be used in the ensuing processing for acquiring azimuth information, the amount of error included in the results would be large. Processing is therefore conducted to exclude information from satellites having an angle of elevation of for example, 85 degrees or greater.

The second cause for exclusion is "blocking by ground features." Even if a satellite is present in the coverage area of one antenna, the strength of the signal from the satellite will be weak in the GPS receiver unit connected to the antenna if the propagation path is blocked by the topography, a building, trees or other such ground features. Therefore, in both antenna coverage areas, i.e., both GPS receivers, satellite signals below a prescribed threshold of, say, −125 dBm, are excluded from the ensuing processing on the assumption of that blocking by ground features has occurred.

Second, it conducts "region-of-presence discrimination" processing using the received signal strengths to discriminate the antenna sky coverage area in which each satellite is present. When the signal strength is high (at or above the threshold) in one GPS receiver and not so in the other, the satellite can be judged to be present in the former sky coverage area. When the signal strengths in both GPS receivers ac high it is judged flat the satellite happens to be present on the boundary between the two sky coverage areas. This discrimination result is noted by a symbol.

Third, it conducts processing for "rearrangement in a ring-like sequence in order of azimuth". In this, the results of the region-of-presence discrimination are rearranged in a ring-like sequence utilizing the azimuths as indices and, utilizing the property of azimuths that 360 degrees and 0 degree coincide, the end and start are connected to form a ring-like sequence.

Fourth, it conducts processing to acquire azimuth information from the ring-like sequence of satellites The term "azimuth information" encompasses both the concept or "azimuth determination," meaning to associate an azimuth with a specific direction, and the concept of "azimuth limitation," meaning to associate an azimuth range with a specific direction. While the GPS receiver of this invention can acquire both types of azimuth information, the explanation that follows will focus on general azimuth limitation acquisition.

The ring-like sequence obtained from the region-of-presence discrimination is examined to find portions where the region-of-presence discrimination result shifts from one value to another value.

Say, for example, that, as shown in FIG. 5, six satellites denoted 3, 6, 11, 14, 18 and 20 are present in the sky coverage area of the antenna 2a and six satellites denoted 2, 7, 9, 15, 21 and 22 are present in the sky coverage area of the antenna 2b. Based on an azimuth notation that defines north as 0 degree and the number of degrees to increase clockwise, the data processing unit 9a processes the signals received from these satellites to compile the satellite data shown in Table 1.

The signal strength of satellite 21 is below the threshold of −125 dBm in both coverage areas and the angle of elevation of satellite 3 is greater than 85 degrees. The data processing unit 9a therefore conducts processing to exclude the information from the two satellites 21 and 3.

As can be seen from Table 2, the sky coverage area of the antenna 2a subsumes the "azimuth range defined clockwise between a start azimuth of 244 degrees and an end azimuth of 6 degrees," and the sky coverage area of the antenna 2b subsumes the "azimuth range defined clockwise between a start azimuth of 56 degrees and an end azimuth of 21 degrees."

As can be seen from FIG. 5, however, the geometric relationship between the measurement direction and the sky coverage areas of the two antennas is such that the sky coverage area of the antenna 2a, the measurement direction 17, and the sky coverage area of the antenna 2b appear sequentially in the order mentioned in the clockwise direction.

For this order and the aforesaid subsumption relationship not to be inconsistent, the azimuth of the measurement direction 17 must be present in the "azimuth range defined clockwise between a start azimuth of 6 degrees and an end

TABLE 1

| Column 1 Satellite number | Column 2 Azimuth (deg) | Column 3 Elevation angle (deg) | Column 4 First signal strength (dBm) | Column 5 Second signal strength (dBm) | Column 6 Exclusion decision | Column 7 Region decision |
|---|---|---|---|---|---|---|
| 14 | 6 | 68 | −96 | −197 | — | 1 |
| 9 | 56 | 32 | −198 | −101 | — | 2 |
| 2 | 110 | 49 | −178 | −75 | — | 2 |
| 7 | 128 | 31 | −188 | −25 | — | 2 |
| 15 | 177 | 15 | −210 | −82 | — | 2 |
| 22 | 218 | 13 | −189 | −76 | — | 2 |
| 18 | 244 | 32 | −68 | −173 | — | 1 |
| 20 | 262 | 12 | −106 | −184 | — | 1 |
| 11 | 285 | 28 | −81 | −180 | — | 1 |
| 6 | 313 | 9 | −77 | −234 | — | 1 |
| 3 | 340 | 86 | −89 | −140 | High elevation angle exclusion | |
| 21 | 144 | 4 | −196 | −194 | Ground feature blocking exclusion | |

The data processing unit 9a generates a directional ring-like sequence R. R generated from the data in the seventh column of Table 1 becomes "1, 2, 2, 2, 2, 2, 1, 1, 1, 1 (return to start). In the table, 1 denotes the sky coverage area of the antenna 2a and 2 denotes the sky coverage area of the antenna 2b.

The ring-like sequence R is shown in Table 2.

azimuth of 56 degrees." The processing unit 9a can instantaneously determine this range from Table 2. This range is indicated as First Azimuth Information in FIG. 5.

As can also be seen from FIG. 5, the geometric relationship between the direction opposite the measurement direction (azimuth of measurement direction 17+180 degrees) and the sky coverage areas of the two antennas is such that

TABLE 2

| Region decision | Series structure | Satellite No. | Azimuth (deg) | Acquisition of azimuth information from series structure boundaries | Result |
|---|---|---|---|---|---|
| 1 | ↓ | 14 | 6 | Measurement direction 17:6 deg to 56 deg clockwise | Measurement direction 17: 38 deg to 56 deg clockwise |
| 2 | • | 9 | 56 | | |
| 2 | ↓ | 2 | 110 | | |
| 2 | ↓ Antenna | 7 | 128 | | |
| 2 | ↓ 2b region | 15 | 177 | | |
| 2 | ι | 22 | 218 | (Measurement direction 17 + 180): 218 deg to 244 deg clockwise | |
| | ↓ | | | | |
| 1 | • | 18 | 244 | | |
| 1 | │ Antenna | 20 | 262 | | |
| 1 | │ 2a region | 11 | 285 | | |
| 1 | │ | 6 | 313 | | | the sky coverage area of the antenna 2b and the sky coverage area of the antenna 2a appear sequentially in order in the clockwise direction and counterclockwise directions, respectively.

For this order and the aforesaid subsumption relationship not to be inconsistent, the azimuth of the direction opposite the measurement direction must be present in the "azimuth range defined clockwise between a start azimuth of 218 degrees and an end azimuth of 244 degrees." The processing unit 9a can instantaneously determine this range from Table 2. This range is indicated as Second Azimuth information in FIG. 5.

The data processing unit 9a determines from the logical product of the two items of azimuth information obtained in the foregoing manner that the measurement direction 17 is present in the "azimuth range defined clockwise between a start azimuth of 38 degrees and an end azimuth of 56 degrees." It sends this determination to the result output unit 5a for voice announcement or display on a liquid crystal display device.

When it is found that a satellite is present on the boundary between the two sky coverage areas, the determination of the azimuth of the measurement direction is made not by azimuth limitation but as explained below.

In such a case it is important to discriminate whether the satellite concerned is present in the measurement direction or in the direction opposite the measurement direction. This discrimination can be made easily in the following manner.

If it is ascertained that the geometrical relationship between the direction or the satellite and the sky coverage areas of the two antennas is such that the clockwise order of "sky coverage area of antenna 2a, satellite, sky coverage area of antenna 2b" holds, the data processing unit 9a immediately decides the azimuth of the satellite to be the measurement direction.

Conversely, if it is ascertained that the clockwise order of "sky coverage area of antenna 2b, satellite, sky coverage area of antenna 2a" holds, the azimuth of the satellite is decided to be the direction opposite the measurement direction. The data processing unit 9a determines the measurement direction by subtracting 180 degrees from the direction opposite the measurement direction.

The data processing unit can be configured as a general-purpose microprocessor having arithmetic computation capability and memory capability.

The control switch can be a mercury switch that utilizes the fact that mercury flows downward under gravitational pull and is electrically conductive. Use of such a switch eliminates the need for troublesome switching operations.

Figure 6A:
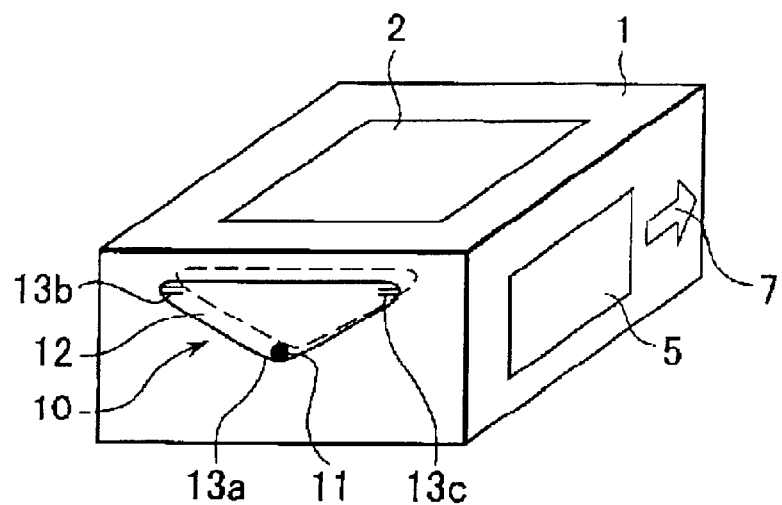
FIG. 6(*a*) is a perspective view for explaining how positioning information is acquired using a mercury switch as an operation switch.

Specifically, as shown in FIG. 6(a), a mercury switch 10 comprising a triangular sealed container 12 containing mercury 11 is mounted in the GPS receiver 1 so that is apex points downward when the GPS receiver 1 is placed with the antenna 2 facing upward. A contact 13a at the apex of the sealed container 12 is wired to turn ON the GPS receiver unit, data processing unit and result output unit a side contact 13b is wired to turn on the GPS receiver unit, data processing unit, data processing unit and result output unit, and another side contact 13c is wired to turn ON the GPS receiver unit and data transmitting unit.

When the GPS receiver is used to acquire positioning information, it is placed with its planar patch antenna 2 facing the zenith as shown in FIG. 6(a). As the mercury 11 therefore goes to the contact 13a of the mercury 11 of the mercury switch 10, the GPS receiver unit, data processing unit and result output unit are turned ON to enable acquisition of positioning information.

Figure 6B:
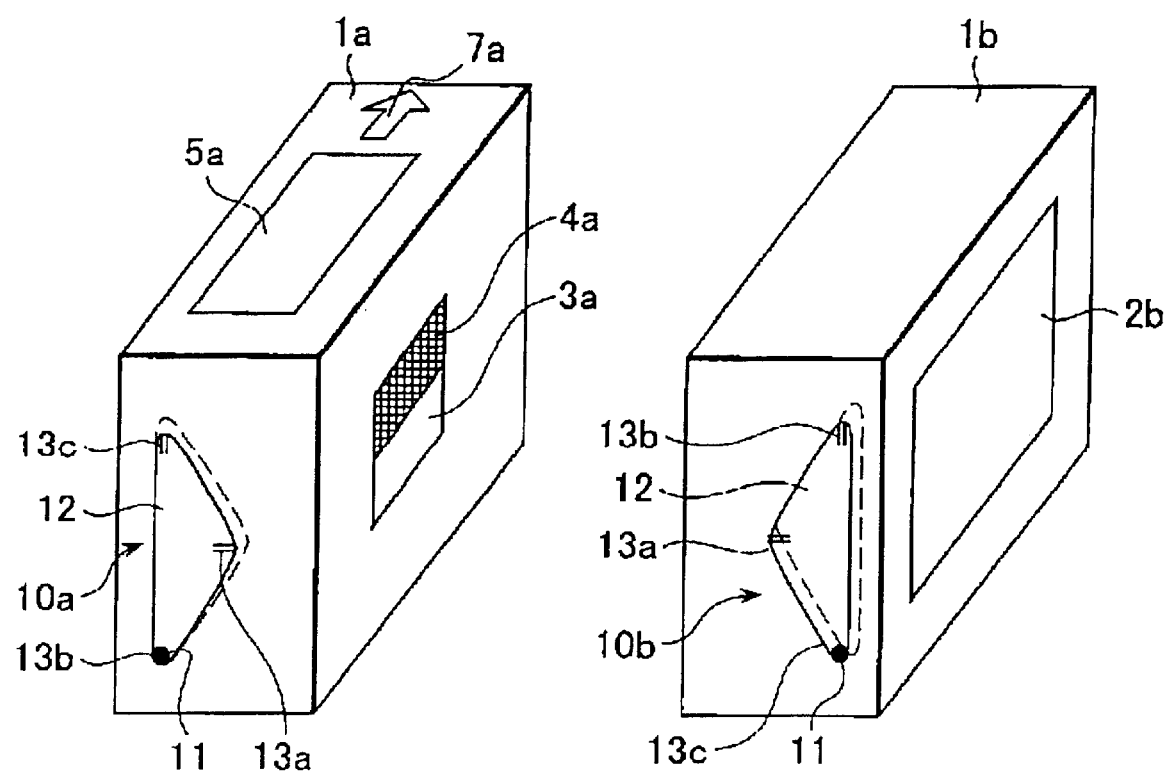

When a pair of GPS receivers 1a, 1b are used to constitute a GPS receiver system for acquiring azimuth information, they are placed with the data transmitting unit and data receiving unit of each facing the data receiving unit and data transmitting unit of the other as shown in FIG. 6(b). In the GPS receiver 1a, the mercury 11 therefore goes to the contact 13b of the mercury switch 10a to turn ON the data receiving unit, data processing unit and result output unit, while in the GPS receiver 1b, the mercury 11 goes to the contact 13c of the mercury switch 10b to turn ON the data receiving unit and data transmitting unit. Signals received by the GPS receiver 1b are sent from the data transmitting unit of the GPS receiver 1b to the data receiving unit of the GPS receiver 1a and the data processing unit of the GPS receiver 1a processes these signals together with the signals received by the GPS receiver unit 8a to produce azimuth information.

As explained in the foregoing, the GPS receiver according to the present invention can be used alone to acquire positioning information as heretofore and and a pair of the GPS receivers can be used as a GPS receiver system to acquire heretofore unobtainable azimuth information.

A pair of the GPS receiver according to the present invention can therefore be used by, for example, a mountain climber to rapidly acquire azimuth information upon straying off course and losing his or her directions. Moreover, since the two units transmit and receive data using an infrared beam and no wire connection is required the two units can be set up quickly and easily.

In addition, the GPS receiver has excellent manufacturability because the paired units are identical in design and specifications.

Further, as will be understood from the foregoing explanation, the data transmitting unit of the GPS receiver 1a and the data receiving unit and data processing unit of the GPS receiver 1b are not required (not used) for acquisition of azimuth information. By adopting a simplified design that eliminates these components, therefore, it is possible to provide inexpensive GPS receivers (GPS receiver systems) for acquiring positioning information and azimuth information.

What is claimed is:

1. A GPS receiver comprising:
    a patch antenna unit for receiving signals transmitted from a GPS satellite;
    a GPS receiver unit for calculating positioning information from GPS satellite signals received by the antenna unit;
    a data transmitting unit for transmitting to another GPS receiver GPS satellite signals received by the antenna unit;
    a data processing unit for carrying out calculation on data containing strength values of received GPS satellite signals to limit or determine an azimuth of a measurement direction;
    a data receiving unit for receiving signals transmitted by a data transmitting unit of another GPS receiver and forwarding them to the data processing unit; and
    a control switch for controlling use mode of the GPS receiver unit, data transmitting unit, data receiving unit, data processing unit and result output unit.

2. A GPS receiver according to claim 1, wherein the data transmitting unit includes an infrared transmit facility and the data receiving unit includes an infrared receive facility.

3. A GPS receiver according to claim 1 or 2, wherein the data transmitting unit and the data receiving unit are installed symmetrically with respect to a center point of an installation surface.

4. A GPS receiver according to claim 1, wherein the control switch is a mercury switch.

5. A GPS receiver system comprising:
- a first GPS receiver equipped with a patch antenna unit, a GPS receiver unit, a data receiving unit, a data processing unit for carrying out calculation on data containing strength values of received GPS satellite signals, and a result output unit;
- a second GPS receiver equipped with a patch antenna unit, a GPS receiver unit and a data transmitting unit;
- the data transmitting unit of the second GPS receiver sending GPS satellite data received by the second GPS receiver through the data receiving unit of the first GPS receiver and to the data processing unit of the first GPS receiver, and the data processing unit of the first GPS receiver carrying out calculation on data containing strength values of the received GPS satellite signals of both the first and second GPS receivers to limit or determine an azimuth of a measurement direction.

6. A GPS receiver system according to claim 5, wherein the data receiving unit of the first GPS receiver includes an infrared receive facility and the data transmitting unit of the second GPS receiver infrared transmit facility.

* * * * *

UNITED STATES PATENT AND TRADEMARK OFFICE
CERTIFICATE OF CORRECTION

PATENT NO. : 6,542,115 B2
DATED : April 1, 2003
INVENTOR(S) : Takahashi

It is certified that error appears in the above-identified patent and that said Letters Patent is hereby corrected as shown below:

<u>Title page,</u>
Item [75], should read:
-- [75] Inventor: Masato Takahashi, c/o
                Communications Research Laboratory,
                Independent Administrative Institution,
                4-2-1 Nukui-kitamachi, Koganei-shi,
                Tokyo (JP) --

Signed and Sealed this

Second Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,542,115 B2
DATED : April 1, 2003
INVENTOR(S) : Takahashi

It is certified that error appears in the above-identified patent and that said Letters Patent is hereby corrected as shown below:

<u>Title page,</u>
Item [30], Foreign Application Priority Data should read

-- [30]     Foreign Application Priority Data

Nov. 30, 2000   (JP)……………………………..2000-364605 --

Signed and Sealed this

Ninth Day of December, 2003

JAMES E. ROGAN
*Director of the United States Patent and Trademark Office*